United States Patent [19]

Shuler

[11] Patent Number: 5,181,567
[45] Date of Patent: Jan. 26, 1993

[54] METHOD FOR PROLONGING THE USEFUL LIFE OF POLYMERIC OR BLENDED SCALE INHIBITORS INJECTED WITHIN A FORMATION

[75] Inventor: Patrick J. Shuler, Yorba Linda, Calif.

[73] Assignee: Chevron Research and Technology Company, San Francisco, Calif.

[21] Appl. No.: 887,569

[22] Filed: May 18, 1992

Related U.S. Application Data

[63] Continuation of Ser. No. 729,744, Jul. 2, 1991, abandoned, which is a continuation-in-part of Ser. No. 528,636, May 23, 1990, Pat. No. 5,038,861.

[51] Int. Cl.$^5$ .............................................. E21B 43/12
[52] U.S. Cl. .................................. 166/279; 166/305.1; 252/8.552
[58] Field of Search ...................... 166/279, 300, 305.1, 166/310, 371; 252/8.552

[56] References Cited

U.S. PATENT DOCUMENTS

| | | | |
|---|---|---|---|
| 3,021,901 | 2/1962 | Earlougher | 166/279 |
| 3,336,221 | 8/1967 | Ralston | |
| 3,467,192 | 9/1969 | Nolan, III et al. | 166/279 |
| 3,481,869 | 12/1969 | Jones | 252/181 X |
| 3,483,925 | 12/1969 | Slyker | 166/279 |
| 3,794,194 | 2/1974 | Zecher | 252/180 X |
| 3,867,286 | 2/1975 | Quinlan | 252/180 X |
| 3,885,913 | 5/1975 | Redmore | 252/148 |
| 3,966,630 | 6/1976 | Quinlan | 252/8.552 |
| 3,982,894 | 9/1976 | Annand et al. | 252/148 X |
| 4,191,249 | 3/1980 | Sarem | 166/279 X |
| 4,234,511 | 11/1980 | Buckman | 252/180 X |
| 4,462,718 | 7/1984 | McLaughlin et al. | 166/305.1 X |
| 4,485,874 | 12/1984 | Meyers | 166/279 |
| 4,536,292 | 8/1985 | Matz | 210/701 |
| 4,692,315 | 9/1987 | Greaves et al. | 422/18 |
| 4,719,083 | 1/1988 | Baker et al. | 422/15 |
| 4,741,400 | 5/1988 | Underdown | 166/279 |
| 4,779,679 | 10/1988 | Snavely, Jr. et al. | 166/279 |
| 4,860,829 | 8/1989 | Carlberg | 166/279 |
| 4,913,880 | 4/1990 | Chen et al. | 422/15 |
| 4,947,934 | 8/1990 | Hen | 166/279 |

FOREIGN PATENT DOCUMENTS

| | | |
|---|---|---|
| 0082657 | 12/1982 | European Pat. Off. |
| 0181151 | 10/1985 | European Pat. Off. |
| 1520915 | 9/1975 | United Kingdom |
| 1575173 | 2/1978 | United Kingdom |
| 2168359 | 6/1986 | United Kingdom |
| 2231565 | 3/1989 | United Kingdom |

Primary Examiner—George A. Suchfield
Attorney, Agent, or Firm—E. A. Schaal; W. K. Turner

[57] ABSTRACT

A method is disclosed for prolonging the useful life of polymeric scale inhibitors or blends of non-polymeric and polymeric scale inhibitors injected within a formation. This method involves injecting an aqueous solution of polyquaternary amines into the formation. This solution of polyquaternary amines can be injected prior to, simultaneously with, or after the injection of the scale inhibitors. The scale inhibitors are preferably a blend of non-polymeric and polymeric scale inhibitors. Preferably, the polyquaternary amine is a poly-(dimethylamine-co-epichlorohydrin) or a poly-(diallyldimethylammonium chloride).

14 Claims, No Drawings

METHOD FOR PROLONGING THE USEFUL LIFE OF POLYMERIC OR BLENDED SCALE INHIBITORS INJECTED WITHIN A FORMATION

This is a continuation of application Ser. No. 729,744, filed Jul. 12, 1991, now abandoned.

This application is a continuation in part of application Ser. No. 528,636, dated May 23, 1990, now U.S. Pat. No. 5,038,861.

The present invention relates to the scale inhibitor squeeze process applied in production wells.

BACKGROUND OF THE INVENTION

Scale inhibitors are applied in production wells to prevent precipitation of water-borne deposits, such as barium sulfate, calcium carbonate, and calcium sulfate. Such precipitates can hinder fluid production by blocking the flow paths either inside the formation or at the perforations. Scale deposition also can appear in the tubing, slowing fluid production and damaging downhole equipment.

One common method of applying a scale inhibitor is the "squeeze process." The steps involved in the squeeze process include:

1. injecting the aqueous scale inhibitor solution (often a low percent inhibitor concentration),
2. injecting an overflush brine solution to push the scale inhibitor several feet away from the wellbore,
3. shutting-in the well for about a day to allow maximum retention of the inhibitor on the rock surfaces, and
4. putting the well back on normal production.

The produced water then slowly leaches the retained scale inhibitor from the formation. Ideally this places a low, but still effective, concentration (typically a low mg/l) of the scale inhibitor into the produced water to prevent scale deposition for many weeks or even months.

Measurement of the concentration of scale inhibitor after such a squeeze treatment often shows:

1. a short period of no inhibitor while the overflush is produced back;
2. a rapid increase of inhibitor concentration for a short time, representing material not retained well in the formation; and
3. a gradual decline of inhibitor concentration.

This continues until the inhibitor concentration finally falls to the minimum effective concentration. The "squeeze lifetime" is the length of time to this point. Then the squeeze must be repeated.

The squeeze process is chemically inefficient. The inhibitor concentration is higher than necessary, particularly in the early stages, and a significant amount of the inhibitor often remains adsorbed inside the formation after the squeeze. Usually two-thirds of the injected scale inhibitor is wasted.

An ideal scale inhibitor return curve for scale inhibitor concentration shows that, once the overflush is brought back, the inhibitor desorbs into the produced water such that the chemical concentration is just above the minimum effective level. This continues until all squeezed inhibitor is released from the formation. Such an ideal process would have a chemical efficiency of almost 100%, or equivalently, a longer squeeze life with the same amount of scale inhibitor.

SUMMARY OF THE INVENTION

The present invention is a method for prolonging the useful life of polymeric scale inhibitors injected within a formation. This method involves injecting an aqueous solution of the polymeric scale inhibitors and an aqueous solution of polyquaternary amines into the formation. The polymeric scale inhibitors may or may not contain non-polymeric scale inhibitors. The solution of polyquaternary amines can be injected before, with, or after the injection of the scale inhibitors.

Preferably, the scale inhibitors are a blend of polymeric and non-polymeric scale inhibitors. The polymeric scale inhibitors preferably are polyacrylates, polymaleic acids, polyacrylamides, phosphinopolycarboxylic acids, and most preferably are phosphinopolycarboxylic acids, such as phosphinopolyacrylic acid. If non-polymeric scale inhibitors are used with the polymeric scale inhibitors, the non-polymeric scale inhibitors are preferably amine phosphonates, such as aminotri (methylene phosphonic acid) and diethyltriaminepenta (methylene phosphonic acid). Preferably, the polyquaternary amine is either a poly-(dimethylamine-co-epichlorohydrin) or a poly-(diallyldimethylammonium chloride).

DETAILED DESCRIPTION OF THE PREFERRED EMBODIMENTS

In its broadest aspect, the present invention is a method for prolonging useful life of polymeric scale inhibitors injected within a formation. This method involves injecting polymeric scale inhibitors and polyquaternary amines into the formation.

THE INJECTION METHOD

The solution of polymeric scale inhibitors can be injected before, during, or after the injection of the polyquaternary amines. Injecting the polymeric scale inhibitor solution before or after the polyquaternary amine solution may improve squeeze life more than if injected simultaneously with the amine. On the other hand, injecting the polymeric scale inhibitor simultaneously with the polyquaternary amine requires one less mixing tank and is less complicated to administer.

THE SCALE INHIBITORS

By "scale inhibitors," we mean chemical additives that will prevent the formation of water-borne deposits even at low concentrations of additives. Types of scale inhibitors that would work in the present invention include, but are not limited to, polymeric scale inhibitors such as polyacrylates, polymaleic acids, polyacrylamides, and phosphino-polyacrylates. Non-polymeric scale inhibitors that would work include, but are not limited to, phosphate esters and phosphonates. Squeeze treatments commonly use phosphonate chemistry.

Polymeric scale inhibitors are used in this process, alone or in conjunction with non-polymeric scale inhibitors. Preferably, the polymeric scale inhibitors have a molecular weight range of 500 to 10,000. The phosphino-polyacrylates are the most preferred polymeric scale inhibitors for squeeze treatments because they can be detected most easily in the produced brine. One phosphino-polyacrylate, phosphinopolyacrylic acid (also known as 2-propenoic acid, polymer with sodium phosphinate), has the chemical formula:

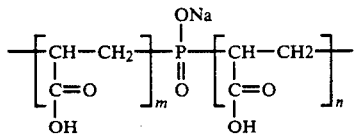

where m and n indicate different length chains.

The scale inhibitors may also contain non-polymeric scale inhibitors, such as aminotri (methylene phosphonic acid) or diethyltriaminepenta (methylene phosphonic acid). The chemical formula for aminotri (methylene phosphonic acid) is:

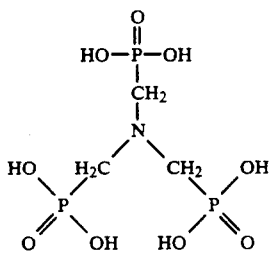

The selection of scale inhibitor can be based upon the chemistry of the water borne deposit. For example, a diethyltriamine (methylene phosphonic acid) and/or a phosphino-polyacrylic acid inhibitor probably would be preferred to prevent barium sulfate deposition.

THE POLYQUATERNARY AMINES

By "polyquaternary amine," we mean a polymer containing the following repeat group:

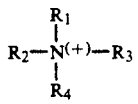

$R_1$, $R_2$, $R_3$, and $R_4$ can be any aliphatic or aromatic group.

Types of polyquaternary amines that would work in the present invention include, but are not limited to, poly-(dimethylamine-co-epichlorohydrin) or poly-(diallyldimethylammonium chloride). Depending upon the brine and formation chemistry, one polyquaternary amine may be more effective than another in extending squeeze lifetime. A preferred embodiment is to use polyquaternary amines with molecular weights below 50,000. Higher molecular weight materials may be difficult to inject.

The chemical formula for a useful polyquaternary amine is a poly-(dimethylamine-co-epichlorohydrin):

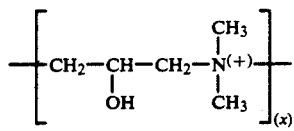

It is sold as a clay stabilizer, used to prevent clay swelling and migration and subsequent formation damage.

The performance of the polyquaternary amines in preserving the useful life of scale inhibitors may depend on many factors, including the type of formation, the temperature of the solution or solutions and ground fluids, and the flow rates of said fluids.

A METHOD FOR INHIBITING SCALE BUILDUP

In one embodiment, scale buildup within a formation surrounding a production well is inhibited by the steps of stopping the production well; injecting into the production well an aqueous solution of polyquaternary amines, an aqueous solution of polymeric scale inhibitor, and a water flush; shutting in the production well; and starting the production well.

By "stopping a production well," we mean halting normal production. After production is stopped, any necessary mechanical modifications are performed to allow subsequent fluid injection.

By "water flush," we mean an aqueous brine solution that is injected into a well undergoing a squeeze treatment.

By "shutting in a production well," we mean halting fluid injection and allowing the injected chemicals time to adsorb to the formation rock.

By "starting a production well," we mean resuming the normal production of fluids.

One embodiment of the invention could include the following squeeze make-up and process:

A core is typically 1" dia. × 12" long unfired Berea sandstone. A fresh core is used for each experiment, having approximately 30 ml. pore volume (PV). The temperature and pressure are ambient conditions. The brine is 0.75% NaCl and 184 mg/l $CaCl_2.2H_2O$ (50 mg/l Ca).

The squeeze is comprised of the following steps:

1. Clean the core with acetone, toluene, and brine.
2. Inject polyquaternary amine solution (if included in that test), followed by a flush. The polyquaternary amine solution is Haliburton's CLASTA II, 2% in a 2% $NH_4Cl$ brine, 2 PV at 0.5 ml/min. The flush is with 2 PV of Brine, 0.5 l/min.
3. Inject scale inhibitor solution. The scale inhibitor solution is either:
   a. A phosphino-polyacrylate such as Ciba Geigy's Belasol S-29, 2% in Brine (0.25 PV at 0.50 ml./min.);
   b. A blend of non-polymeric and polymeric scale inhibitors, ranging from approximately a 3:1 volumetric ratio of non-polymeric inhibitor to polymeric inhibitor, to a 1:3 volumetric ratio of non-polymeric inhibitor to polymeric inhibitor, 2% in Brine (0.25 PV at 0.50 ml./min.); or
   c. A commercially-available blend of non-polymeric and polymeric scale inhibitors, such as Baker Chemical's Calnox 167, 2% in Brine (0.25 PV at 0.50 ml./min.).
4. Inject overflush (Brine of 0.5 PV at 0.5 ml./min.).
5. Shut-in core for 20–24 hours.
6. Reverse core.
7. Start injection of Brine at 1.0 ml./min. from other end to mimic a well returning to production following inhibitor squeeze.
8. Collect effluent samples and measure the scale inhibitor concentration. Plot the chemical concentration versus the pore volumes of produced brine.

While the present invention has been described with reference to specific embodiments, this application is intended to cover those various changes and substitutions which may be made by those skilled in the art without departing from the spirit and scope of the appended claims.

What is claimed is:

1. A method for prolonging useful life of scale inhibitors injected within a formation comprising:
   a. injecting an aqueous solution of said scale inhibitors into said formation, wherein said solution of scale inhibitors comprises a polymeric scale inhibitor; and
   b. injecting an aqueous solution of polyquaternary amines into said formation.

2. A method according to claim 1 wherein said polymeric scale inhibitors are polyacrylates.

3. A method according to claim 2 wherein said polyacrylates are phosphino-polyacrylates.

4. A method according to claim 1 wherein said polymeric scale inhibitors are polymaleic acid.

5. A method according to claim 1 wherein said polymeric scale inhibitors are polyacrylamides.

6. A method according to claim 1 wherein said solution of polyquaternary amines is injected prior to the injection of said scale inhibitors.

7. A method according to claim 1 wherein said solution of polyquaternary amines is injected simultaneously with said scale inhibitors.

8. A method according to claim 1 wherein said solution of polyquaternary amines is injected after said scale inhibitors.

9. A method according to claim 1 wherein said polyquaternary amine is a poly(dimethylamine-co-epichlorohydrin).

10. A method according to claim 1 wherein said polyquaternary amine is a poly(diallyldimethylammonium chloride).

11. A method according to claim 1 wherein said solution of scale inhibitors further comprises non-polymeric scale inhibitors.

12. A method according to claim 11 wherein said non-polymeric scale inhibitors are amine phosphonates.

13. A method according to claim 12 wherein said amine phosphonate is aminotri (methylene phosphonic acid).

14. A method according to claim 12 wherein said amine phosphonate is diethyltriaminepenta (methylene phosphonic acid).

* * * * *